F. HACHMANN.
WRENCH.
APPLICATION FILED SEPT. 23, 1909.
992,126.
Patented May 9, 1911.
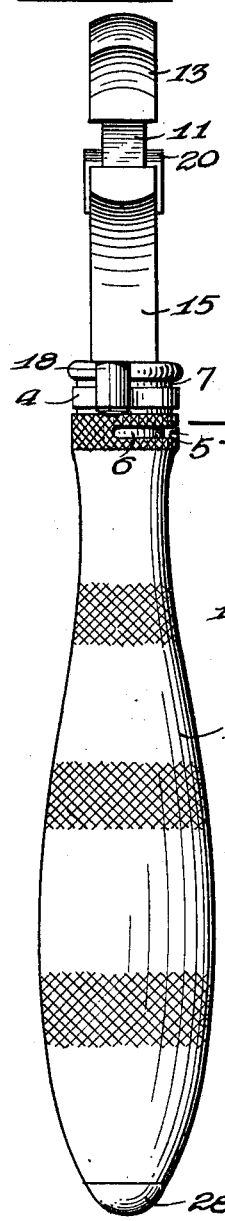
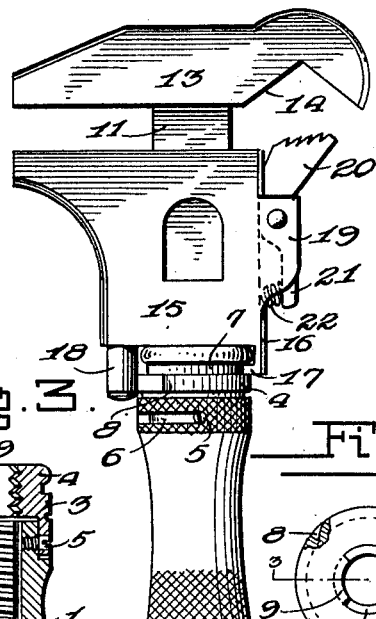
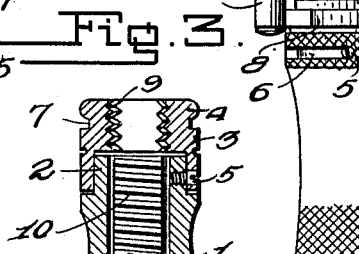
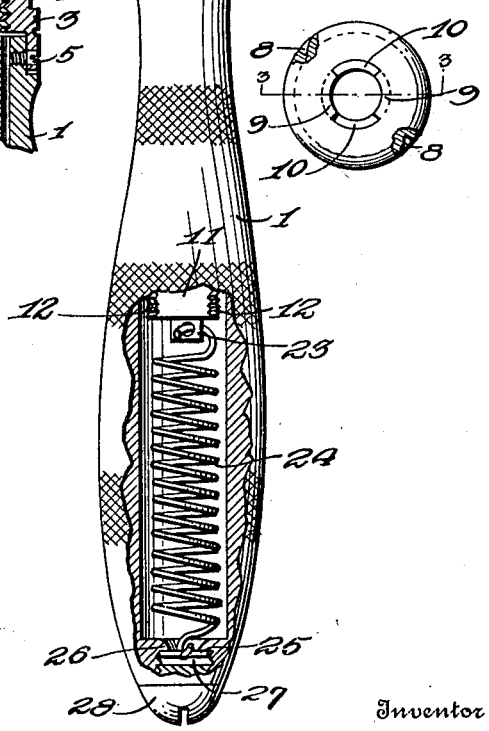
Witnesses
C. Everett Lancaster
H. Joseph Doyle
Inventor
Frederick Hachmann
By E. E. Trooman,
Attorney.
THE NORRIS PETERS CO., WASHINGTON, D. C.

UNITED STATES PATENT OFFICE.

FREDERICK HACHMANN, OF MINNEAPOLIS, MINNESOTA, ASSIGNOR, BY MESNE ASSIGNMENTS, TO CHASE TOOL MANUFACTURING COMPANY, A CORPORATION OF MINNESOTA.

WRENCH.

992,126.  Specification of Letters Patent. Patented May 9, 1911.

Application filed September 23, 1909. Serial No. 519,267.

*To all whom it may concern:*

Be it known that I, FREDERICK HACHMANN, a citizen of the United States, resident of Minneapolis, county of Hennepin, State of Minnesota, have invented certain new and useful Improvements in Wrenches, in particular the style known as "Instantaneous" Adjustable Wrenches, of which the following is a full and comprehensive specification.

This invention relates to nut and pipe wrenches of the type wherein a movable outer jaw and a stationary inner jaw are employed, and the invention contemplates providing means whereby a rotation of the handle will adjust the movable jaw in the direction to set the same to an article to be turned, and auxiliary means which automatically adjusts the movable jaw in an opposite direction after being adjusted by the handle to cause said jaw to clamp said article to the inner jaw.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation of the improved wrench, the handle being broken away to show the automatic means for adjusting the wrench. Fig. 2 is a view in front elevation thereof. Fig. 3 is a fragmentary longitudinal sectional view taken on the line 3—3, Fig. 4. Fig. 4 is a top plan view, partly broken away—the shank, outer jaw, and inner jaw being omitted.

Referring to the accompanying drawings by numerals, 1 designates the hollow handle of the improved wrench, the upper end 2 of which is reduced and extends into the end recess 3 of an adjusting nut 4. Said reduced end 2 is provided with a laterally projecting lug 5 that enters the circumferential slot 6 of the recessed end of nut 4. The slot 6 extends one-quarter of the circumference of the nut 4. The upper end of nut 4 is provided with a circumferential groove 7, and intermediate said groove and the base of said nut, notches 8 are provided. Preferably two of the teeth 8 are provided, said notches being oppositely disposed.

Nut 4 is provided with oppositely disposed quarter threads 9, and the reduced end of the handle 1 is provided with similar threads 10. A shank 11 is slidable in said nut 4 and handle 1, said shank having its longitudinal edges provided with threads 12 complemental to the threads of the handle and the nut 4. Shank 11 is provided with jaw 13 the forward portion of which is adapted for use in connection with nuts or other flat-sided objects, the rear portion being provided with a notch 14 for use in connection with pipes or other tubular objects.

An inner jaw 15 loosely engages shank 11 and is provided with a base extension 16 that has an angular end 17 for engagement with the groove 7 of nut 4 to prevent longitudinal movement of said jaw relative to the handle 1. Said jaw is also provided with a dog 18 that engages the notches 8 of nut 4 to prevent reverse rotation of said nut. The rear of jaw 15 is provided with pivot ears 19 in which an auxiliary jaw 20 is mounted and which coöperates with notch 14 to grasp a pipe. Jaw 20 is provided with a handle or finger grip 21 for operating the same, said grip being normally held away from the jaw 20 by means of a spring 22.

The inner end of shank 11 is provided with a lug 23 to which one end of a contractible spring 24 is fastened. The other end of said spring is connected to a plate 25 that is rotatably held in contact with an annular shoulder 26 in the recessed base 27 of handle 1. A plug 28 normally seals the outer end of said recess.

The reduced end of handle 1 through the lug and slot engagement between said end and the nut 4, permits the handle to be rotated one-quarter of a revolution independent of said nut. The threads of said reduced end being in engagement with the threads of shank 11, it will be seen that as the handle is rotated to adjust the shank 11, when the threads of said ends are leaving the threads of the shank, the nut 5 begins to engage said threads so that when the handle threads are clear of the shank threads, the threads of the nut will prevent spring 24 drawing said shank into the handle. This operation is continued until the jaws are "set" to the article to be turned, after which the threads of the nut and handle are disengaged from the threads of the shank by manipulating the handle, so that the spring 24 will automatically retract shank 11 and thereby clamp the article to be turned. When the handle is released from the shank 11 to permit said shank to be retracted by the spring 24, the notches 8 of nut 4 are engaged by the dog 18, so that reverse movement of said nut is prevented. When in clamping relation, relative movement of the shank and handle is prevented by engaging the nut or the handle with the threads of the shank.

As will be obvious, the plate 25 being rotatable in the base of the handle 1, no twisting strain is exerted on spring 24. It will also be understood that by using a plug in the recess 27, the said plug can be readily removed so that access can be had to spring 24 to release the same from plate 25 when necessary.

What I claim as my invention is:—

1. A wrench comprising a hollow handle having a reduced upper end, a lug carried by said upper end, said upper end provided with quarter threads, a holding nut surrounding said upper end and provided with a slot for the reception of said lug, said nut provided with quarter threads, a shank slidable in said handle and provided with quarter threads that are engaged by the end of the handle and nut, said shank provided with a jaw, an inner jaw loose on said shank and engaging said nut, means carried by said inner jaw for preventing reverse movement of said nut, and means connecting said shank to said handle for automatically adjusting said shank when the threads thereof are disengaged from the threads of the handle and nut.

2. A wrench comprising a handle provided with shank-adjusting means, shank holding means carried by said handle, a shank slidable in said handle and provided with an outer jaw, an inner jaw loose on said shank and engaging said holding means, and a spring having a fixed connection with said shank and a swiveled connection with said handle.

3. A wrench comprising a handle provided with shank-adjusting means, a holding nut carried thereby and capable of limited rotation thereon, a shank slidable in said handle and alternately engaged by said nut and handle for adjustments in one direction, said shank having a fixed jaw, an inner jaw loose on said shank and engaging said nut, and a spring connection between said shank and handle.

4. A wrench comprising a hollow handle provided with internal oppositely disposed threads, a shank slidable therein and provided with similar threads, a holding nut carried by said handle and capable of a limited rotary movement thereon, said nut provided with oppositely disposed threads, a fixed jaw and a loose jaw carried by said shank, means carried by the loose jaw for preventing reverse movement of said nut, and means carried by said handle for retracting the shank when released from the threads of said handle and nut.

In witness whereof, I have hereunto set my hand this 20th day of September 1909.

FREDERICK HACHMANN.

Witnesses:
JOHN P. DEVANEY,
HELEN D. ELLIOT.